(No Model.)
F. SCHACH & W. STELTER.
FEATHER RENOVATOR.
No. 318,039. Patented May 19, 1885.
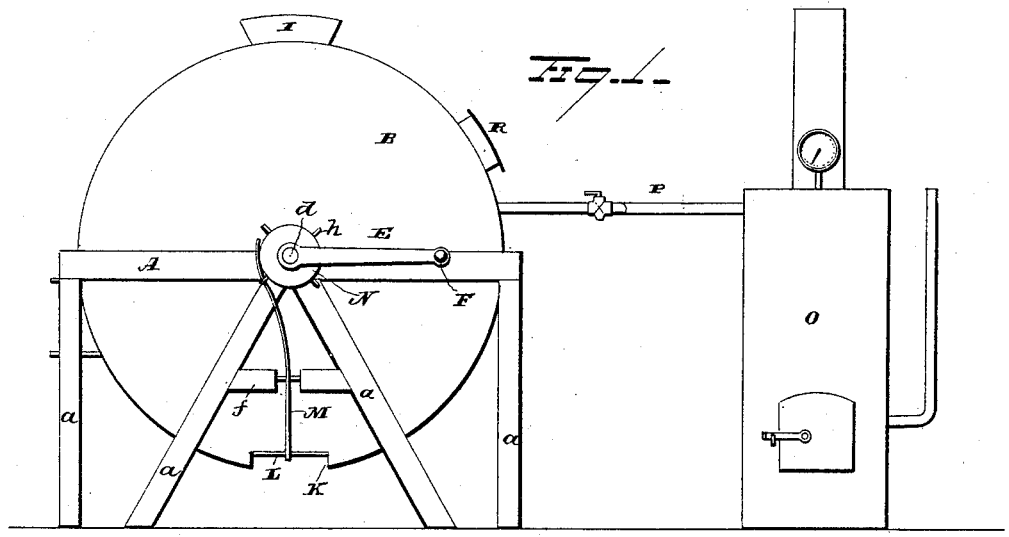
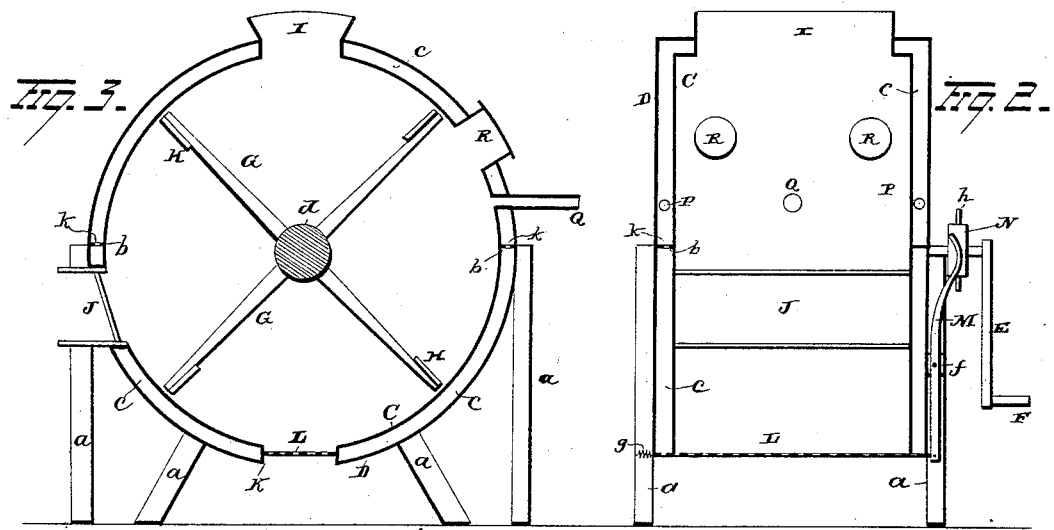
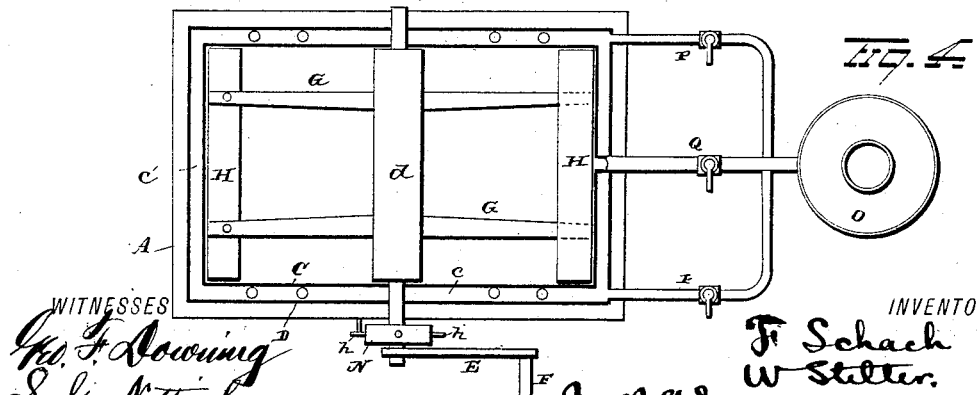
WITNESSES
Geo. F. Downing
S. G. Nottingham
INVENTOR
F. Schach
W. Stelter
By H. A. Simpson ATTORNEY

UNITED STATES PATENT OFFICE.

FRIEDRICH SCHACH AND WILHELM STELTER, OF SEDALIA, MISSOURI.

FEATHER-RENOVATOR.

SPECIFICATION forming part of Letters Patent No. 318,039, dated May 19, 1885.

Application filed October 11, 1884. (No model.)

*To all whom it may concern:*

Be it known that we, FRIEDRICH SCHACH and WILHELM STELTER, of Sedalia, in the county of Pettis and State of Missouri, have invented certain new and useful Improvements in Feather-Renovators; and we do hereby declare the following to be a full, clear, and exact description of the invention, such as will enable others skilled in the art to which it appertains to make and use the same.

Our invention relates to an improvement in feather-renovators, the object of our invention being to provide a device of this character which shall be simple and economical in construction, and at the same time durable and efficient in use; and with these ends in view our invention consists in certain novel features of construction and combinations of parts, as will be hereinafter described, and pointed out in the claims.

In the accompanying drawings, Figure 1 is an end view of our improvement. Fig. 2 is a longitudinal vertical section. Fig. 3 is a vertical cross-section, and Fig. 4 is a horizontal section.

A represents a frame constructed in any desired manner and supported by the legs $a$, in which frame is mounted the drum B, consisting, preferably, of an upper and lower section, joined at $b$. This drum is made of sheet metal, and is formed with double walls C D, leaving a space, $c$, between them for the circulation of steam, as hereinafter described.

In the frame A is journaled a shaft, $d$, which passes through the opposite ends of the drum B, and is provided on one end with a crank and handle, E F.

Within the drum B are the fan-arms G, secured to the shaft $d$, and to the ends of which arms are secured the fans or blades H, adapted, when the handle F is turned, to thoroughly agitate the feathers placed in the drum B through the door or slide I, formed in the top thereof. The feathers, after being cleaned, are removed from the drum through the door or slide J.

In the bottom of the drum is formed an opening, K, over which is placed a sieve, L, one end of which is connected to the lower end of a rod, M, pivoted or otherwise movably secured to a bar, $f$, connecting the legs of the frame, the other end of said sieve being secured to a coiled spring, $g$, fastened to the frame.

On the shaft $d$ is secured a wheel, N, provided on its periphery with the pins or teeth $h$, which, when the handle F is turned, strike against the curved end of the rod M and force it toward the drum, which in turn pulls the sieve in the opposite direction. As soon as the pin passes the end of the rod the coiled spring $g$ pulls the sieve back and retains it in its original position until the next pin $h$ strikes the rod, and in this manner the sieve is kept constantly vibrating, allowing the dirt and impurities to fall through and out of the drum.

O is a boiler or steam-generator of ordinary construction, from which lead the steam-pipes P and Q, the pipe Q leading into the drum and conducting the wet and moist steam to the feathers. After the feathers have been perfectly renovated the steam is cut off from the drum, and the hot dry steam turned into the space $c$ between the two walls of the drum, drying the feathers within the drum, openings $k$ being formed to allow the steam to pass from one section into another, and openings R being formed in the drum, to allow the air to enter to absorb the moisture of the wet steam within the drum.

Our invention is exceedingly simple in construction, is of few parts, and can be manufactured at a small initial cost.

Having fully described our invention, what we claim as new, and desire to secure by Letters Patent, is—

1. In a feather-renovator, the combination, with a drum and a rotary fan located within said drum, of a reciprocating sieve located in the bottom of the drum and devices connecting the sieve with the fan-shaft, whereby the fan and sieve are operated simultaneously.

2. In a feather-renovator, the combination, with a drum, a steam-boiler communicating therewith, and a fan located within the drum, of a reciprocating sieve located at the bottom of the drum and devices connected with the fan-shaft for reciprocating the sieve, substantially as set forth.

3. The combination, with a drum having double walls, a boiler communicating with the interior of the drum and with the space between the walls, and a fan located within the drum, of a reciprocating sieve, a lever connected with the sieve and operated by the fan-shaft for moving the sieve in one direction, and a spring for moving the sieve in the opposite direction, substantially as set forth.

4. The combination, with a drum, of a fan secured to a shaft passing through the drum and a sieve secured to a rod pivoted to the main frame, the upper end of the rod being curved and engaging pins on a wheel secured to said shaft, substantially as set forth.

5. The combination, with a drum having a shaft passing through it, of a sieve, one end of which is secured to a spring fastened to the main frame, a rod pivoted to the main frame, and having its lower end secured to the sieve and its upper end curved, and a wheel secured to the shaft and provided with pins engaging the curved end of said rod, substantially as set forth.

In testimony whereof we have signed this specification in the presence of two subscribing witnesses.

FRIEDRICH SCHACH.
WILHELM STELTER.

Witnesses:
HARRY T. SMITH,
W. L. PORTER.